(12) United States Patent
Yu et al.

(10) Patent No.: US 10,977,019 B2
(45) Date of Patent: Apr. 13, 2021

(54) VEHICLE RADAR SETTING METHOD

(71) Applicant: CUB ELECPARTS INC., Changhua County (TW)

(72) Inventors: San-Chuan Yu, Changhua County (TW); Yu-Tao Yu, Changhua County (TW); Meng-Yu Ho, Changhua County (TW); Jyong Lin, Changhua County (TW)

(73) Assignee: CUB ELECPARTS INC., Changhua County (TW)

( * ) Notice: Subject to any disclaimer, the term of this patent is extended or adjusted under 35 U.S.C. 154(b) by 276 days.

(21) Appl. No.: 15/813,667

(22) Filed: Nov. 15, 2017

(65) Prior Publication Data

US 2019/0146768 A1    May 16, 2019

(51) Int. Cl.
| | |
|---|---|
| *G06F 8/61* | (2018.01) |
| *G01S 13/931* | (2020.01) |
| *G01S 7/40* | (2006.01) |
| *G06F 8/65* | (2018.01) |
| *H04L 29/08* | (2006.01) |
| *G06F 11/14* | (2006.01) |

(52) U.S. Cl.
CPC .............. G06F 8/61 (2013.01); G01S 7/4004 (2013.01); G01S 7/4026 (2013.01); G01S 13/931 (2013.01); G06F 8/65 (2013.01); G06F 11/1433 (2013.01); H04L 67/34 (2013.01)

(58) Field of Classification Search
CPC .................. G01S 13/003; G01S 13/32; G01S 2013/0272; G01S 2013/9375; G01S 2013/9385; G01S 7/02; G01S 7/352; G01S 13/88; G01S 7/003; G01S 13/87; G01S 7/4026; G01S 13/931; G01S 7/4004; H01Q 1/3233; H01Q 23/00; H04L 67/34; H04L 2209/84; G06F 8/65; G06F 11/1433; G06F 1/3209; G06F 2221/0708; G06F 8/61; G06F 8/654; G06F 8/658; G06F 1/3246
See application file for complete search history.

(56) References Cited

U.S. PATENT DOCUMENTS

| | | | |
|---|---|---|---|
| 6,529,808 B1* | 3/2003 | Diem | G01R 31/006 701/31.5 |
| 6,842,713 B1* | 1/2005 | Hutmacher | G01M 99/00 702/122 |
| 2006/0130033 A1* | 6/2006 | Stoffels | G06F 8/61 717/166 |
| 2008/0295090 A1* | 11/2008 | Bestle | G06F 8/65 717/170 |

(Continued)

FOREIGN PATENT DOCUMENTS

| | | |
|---|---|---|
| CN | 102693486 A | 9/2012 |
| TW | 200736090 A | 10/2007 |
| TW | 201427852 A | 7/2014 |

*Primary Examiner* — Olumide Ajibade Akonai
(74) *Attorney, Agent, or Firm* — Muncy, Geissler, Olds & Lowe, P.C.

(57) ABSTRACT

A vehicle radar setting method includes the step of providing a setting tool, the step pf using the setting tool to choose vehicle year, brand and model, the step of fetching the corresponding vehicle radar main program according to the chosen vehicle year brand and model, the step of transmitting the vehicle radar main program to the vehicle radar, and the step of enabling the vehicle radar to receive and install the vehicle radar main program.

4 Claims, 4 Drawing Sheets

(56) References Cited

U.S. PATENT DOCUMENTS

| | | | |
|---|---|---|---|
| 2010/0214149 A1* | 8/2010 | Kuhn | G01S 7/003 342/20 |
| 2010/0228404 A1* | 9/2010 | Link, II | G06F 9/44542 701/1 |
| 2012/0313813 A1* | 12/2012 | Brooks | G01S 7/20 342/159 |
| 2013/0127656 A1* | 5/2013 | Webster | G01S 7/40 342/159 |
| 2014/0109075 A1* | 4/2014 | Hoffman | G06F 8/65 717/169 |
| 2015/0026662 A1* | 1/2015 | Moore | G06F 8/71 717/121 |
| 2015/0169311 A1* | 6/2015 | Dickerson | G06F 8/65 717/170 |
| 2015/0363210 A1* | 12/2015 | Wehrman | G06F 8/65 701/31.5 |
| 2016/0223642 A1* | 8/2016 | Moore | G01S 7/02 |
| 2017/0104865 A1* | 4/2017 | Skelton | H04W 12/06 |
| 2017/0206718 A1* | 7/2017 | Kapoor | G07C 5/0808 |
| 2018/0212967 A1* | 7/2018 | Chen | H04L 63/0823 |
| 2018/0217828 A1* | 8/2018 | Madrid | G06F 8/65 |
| 2019/0075423 A1* | 3/2019 | Hrabak | H04W 4/023 |

* cited by examiner

VEHICLE RADAR SETTING METHOD

BACKGROUND OF THE INVENTION

1. Field of the Invention

The present invention relates to vehicle radar technology and more particularly, to a vehicle radar setting method.

2. Description of the Related Art

To improve traffic safety, a variety of vehicle radars have been widely used in different vehicles for a variety of purposes. However, due to different vehicle brands and models and different radars from different manufacturers use different control programs, the associating setting parameters will be different. Thus, a vehicle depot or repair shop needs to prepare different vehicle radars from different manufacturers or providers for installation and repair to meet the needs of different users. This problem will cause a vehicle depot or repair shop a great distress in preparation of spare parts. Therefore, there is a strong need for a more simplified setting method to improve this problem.

SUMMARY OF THE INVENTION

The present invention has been accomplished under the circumstances in view. It is the main object of the present invention to provide a vehicle radar setting method, which enables a vehicle radar to be set in compliance with the communication format of a predetermined vehicle or radar brand through a simple setting procedure, achieving the purpose of simplifying installation and saving spare parts.

To achieve this and other objects of the present invention, a vehicle radar setting method comprises the step of providing a setting tool, the step of using the setting tool to choose vehicle year, brand and model, the step of fetching the corresponding vehicle radar main program according to the chosen vehicle year brand and model, the step of transmitting the vehicle radar main program to the vehicle radar, and the step of enabling the vehicle radar to receive and install the vehicle radar main program.

Other advantages and features of the present invention will be fully understood by reference to the following specification in conjunction with the accompanying drawings, in which like reference signs denote like components of structure.

DETAILED DESCRIPTION OF THE INVENTION

Figure 1:
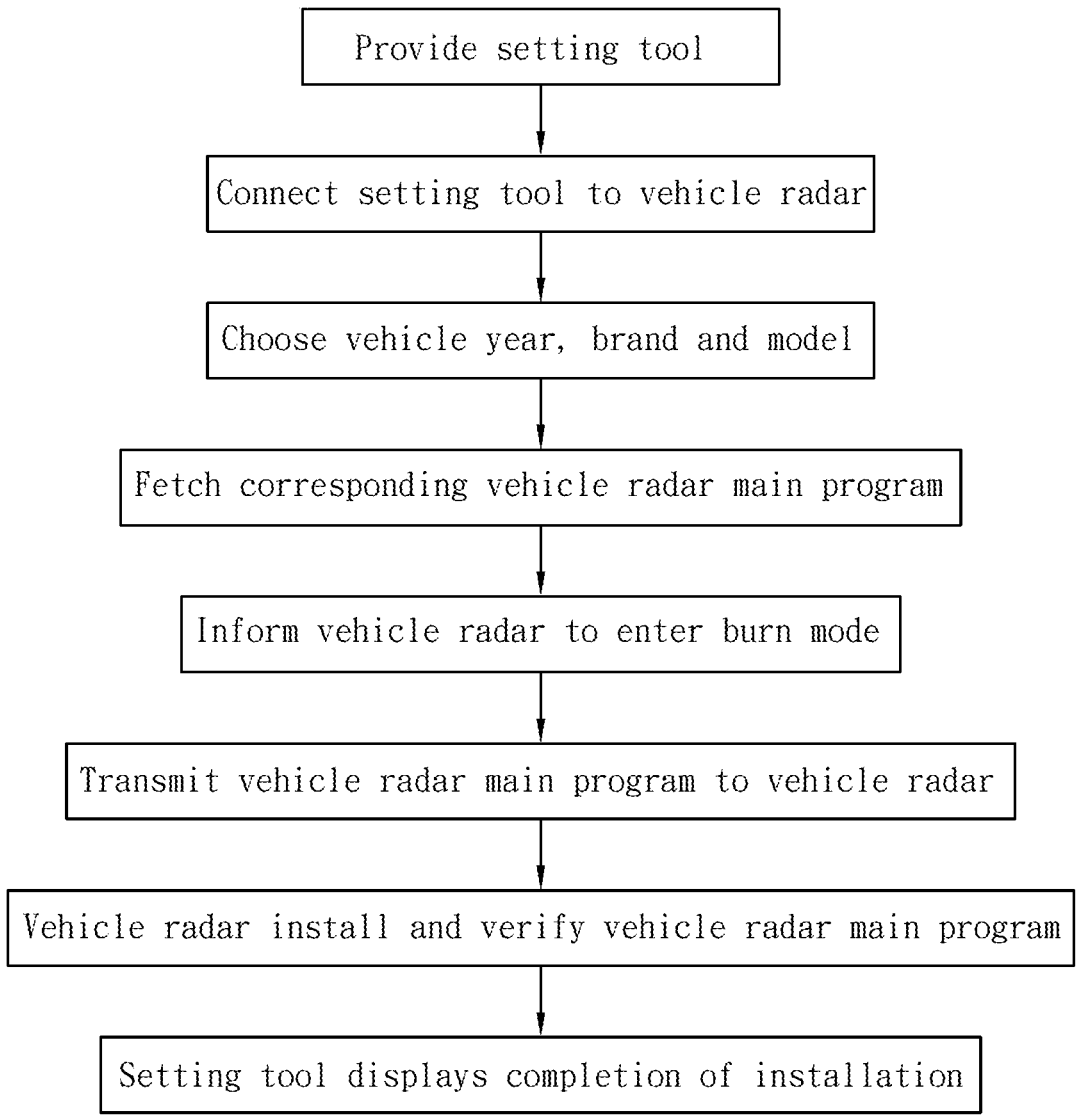
FIG. 1 is a flow chart of a vehicle radar setting method in accordance with a first embodiment of the present invention.
Figure 2:
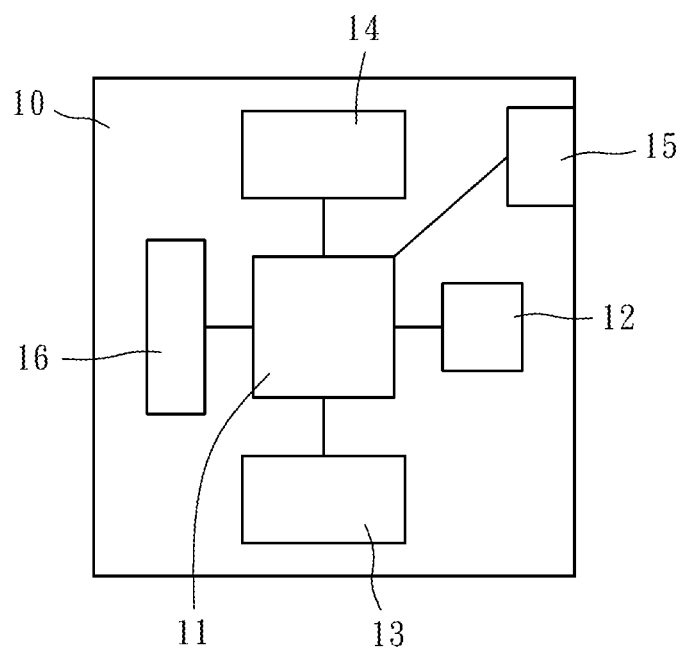
FIG. 2 is a functional block diagram of the setting tool in accordance with the first embodiment of the present invention.

Referring to FIG. 1, a flow chart of a vehicle radar setting method in accordance with a first embodiment of the present invention is shown. The vehicle radar setting method in accordance with the first embodiment of the present invention comprises the steps of:

Step A: Provide a setting tool 10. As shown in FIG. 2, the setting tool 10 comprises a processing unit 11 having electrically connected thereto a memory unit 12, a display 13, an input unit 14, a power source 15 and a communication transmission interface 16. The memory unit 12 has installed therein communication protocols and setting parameters provided by various vehicle or radar providers. The setting parameters include installation angle, installation height and other parameters. Further, the display 13 and the input unit 14 can be integrated into one unit, for example, a touch screen having display and input functions.

Figure 3:
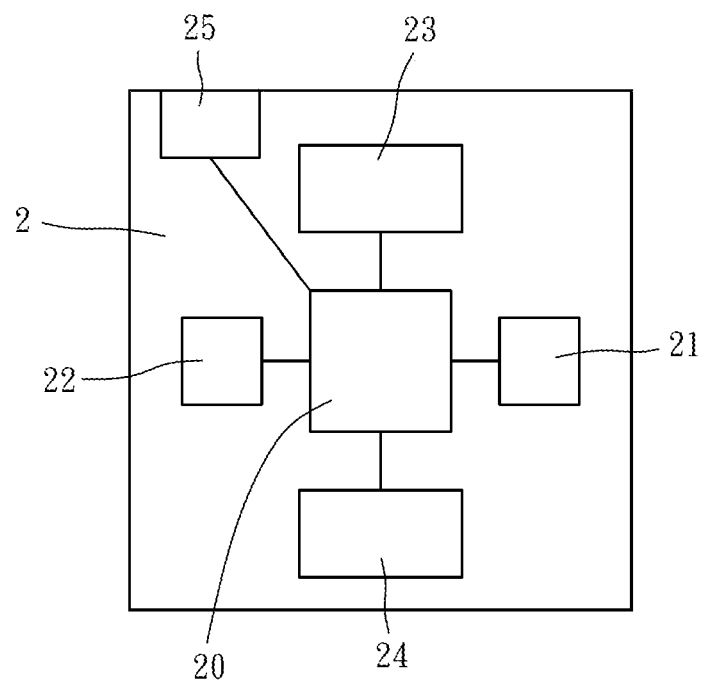
FIG. 3 is a functional block diagram of the vehicle radar in accordance with the first embodiment of the present invention.

Step B: Connect the communication transmission interface 16 of the setting tool 10 to the vehicle radar to be set through a CAN (Controller Area Network). Alternatively, the communication transmission interface 16 of the setting tool 10 can be connected to the vehicle radar 2 to be set through a LIN (Local Interconnect Network) or MOST (Media Oriented System Transport). As illustrated in FIG. 3, the vehicle radar 2 comprises a computing unit 20 having electrically connected thereto a memory unit 21, a communication interface 22, an output unit 23, a RF 24 and a power source 25. The vehicle radar 2 is connected to the setting tool 10 through the communication interface 22. The output unit 23 is adapted for outputting an alarm signal that can be an audio alarm signal or visual alarm signal. The output unit 23 can be omitted in some models.

Step C: Use the input unit 14 of the setting tool 10 to choose the year, brand and model of the vehicle that carries the vehicle radar 2.

Step D: The processing unit 11 of the setting tool 10 fetches from the memory unit 12 the main program corresponding to the year, brand and model of the vehicle the user chosen. This main program contains the control program that controls the main function of the vehicle radar 2 and the related setting parameters.

Step E: The vehicle radar 2 enters a setting mode. In this embodiment, the setting tool 10 sends a signal, causing the vehicle radar 2 to enter the setting mode. The vehicle radar 2 can enter the setting mode through any of other measures.

Step F: In the setting mode, the setting tool 10 transmits the main program to the vehicle radar 2.

Step G: The vehicle radar 2 receives and installs the main program and then verifies that the main program is installed correctly, and then replies a signal to the setting tool 10 after completion of the installation.

Further, Step E can be carried out before Step C or after Step D. Further, Step B is only required before Step E but not limited to before Step C.

By means of the setting method of the first embodiment of the present invention, a setting staff can set a vehicle radar to be in compliance with a predetermined vehicle or vehicle radar communication format by using a setting method of loading a main program in a vehicle or vehicle radar, achieving the purpose of simplifying installation and saving spare parts.

Figure 4:
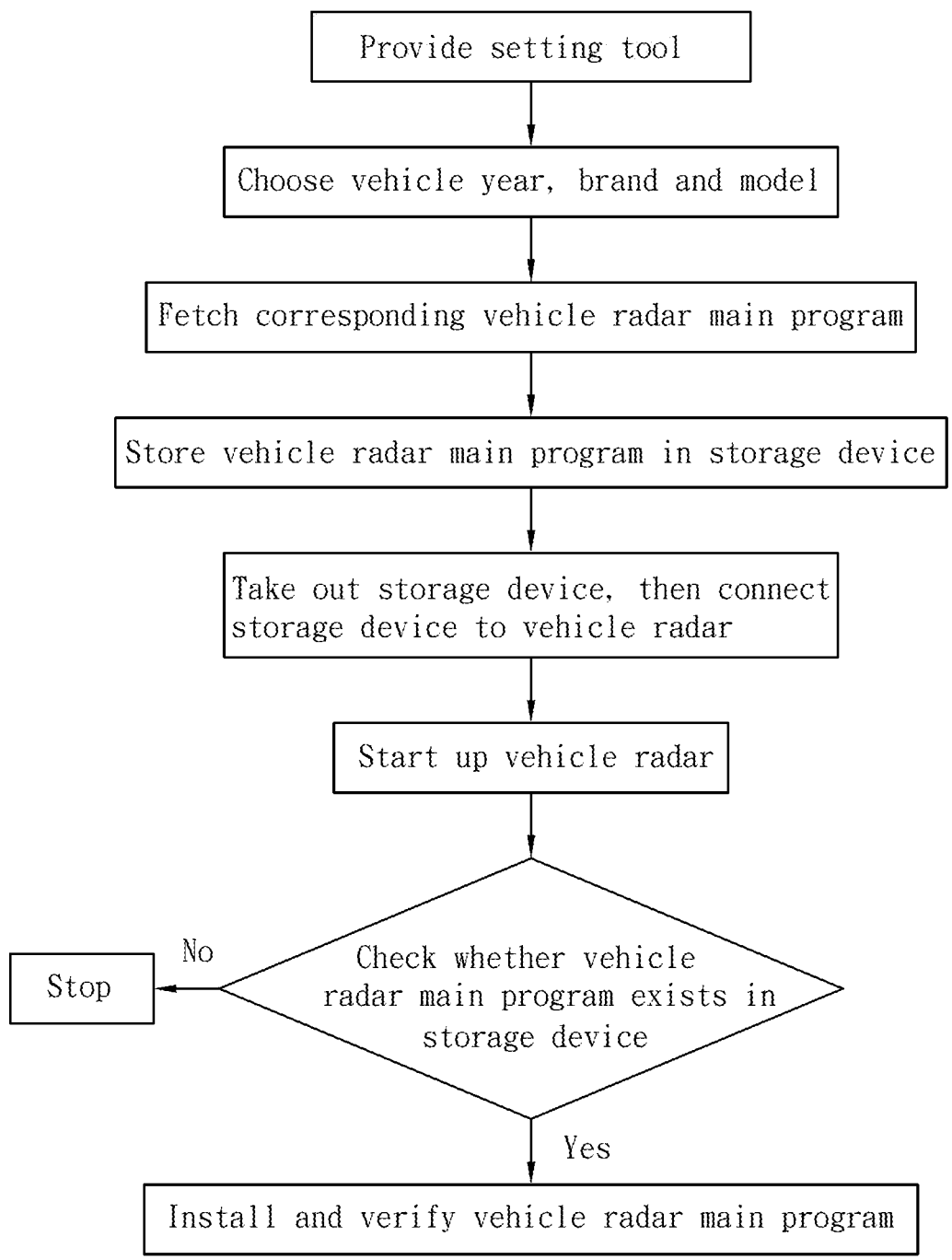
FIG. 4 is a flow chart of a vehicle radar setting method in accordance with a second embodiment of the present invention.
Figure 5:
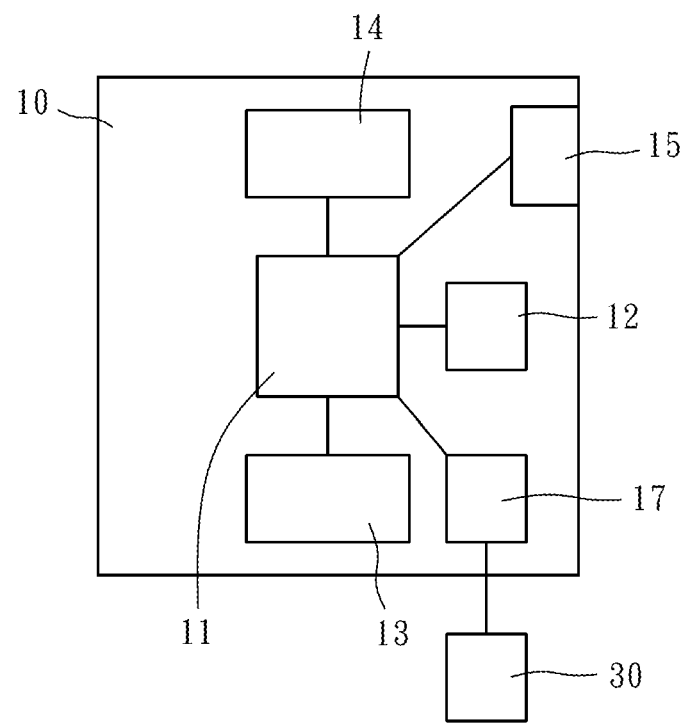
FIG. 5 is a functional block diagram of the setting tool in accordance with the second embodiment of the present invention.

Referring to FIG. 4, a vehicle radar setting method in accordance with a second embodiment of the present invention is shown. This second embodiment is substantially similar to the aforesaid first embodiment with the exception the procedure of transmitting the main program to the vehicle radar. In accordance with this second embodiment, the vehicle radar setting method comprises the steps of:

Step A: Provide a setting tool 10, which, as illustrated in FIG. 5, comprises a processing unit 11 having electrically connected thereto a memory unit 12, a display 13, an input unit 14 and a power source 15. In this second embodiment, the setting tool 10 further comprises a storage data connection port 17 for the connection of a storage device 30 that can be, for example, a flash drive or SD card. As illustrated in FIG. 4, the memory unit 12 has installed therein communication protocols and setting parameters provided by various vehicle or radar providers.

Step C: Use the input unit 14 of the setting tool 10 to choose the year, brand and model of the vehicle that carries the vehicle radar 2.

Step D: The processing unit 11 of the setting tool 10 fetches from the memory unit 12 the main program corresponding to the year, brand and model of the vehicle the user chosen. This main program contains the control program that controls the main function of the vehicle radar 2 and the related setting parameters.

Step I: Store the vehicle radar main program in a storage device 30 that can be a SD card or flash drive.

Figure 6:
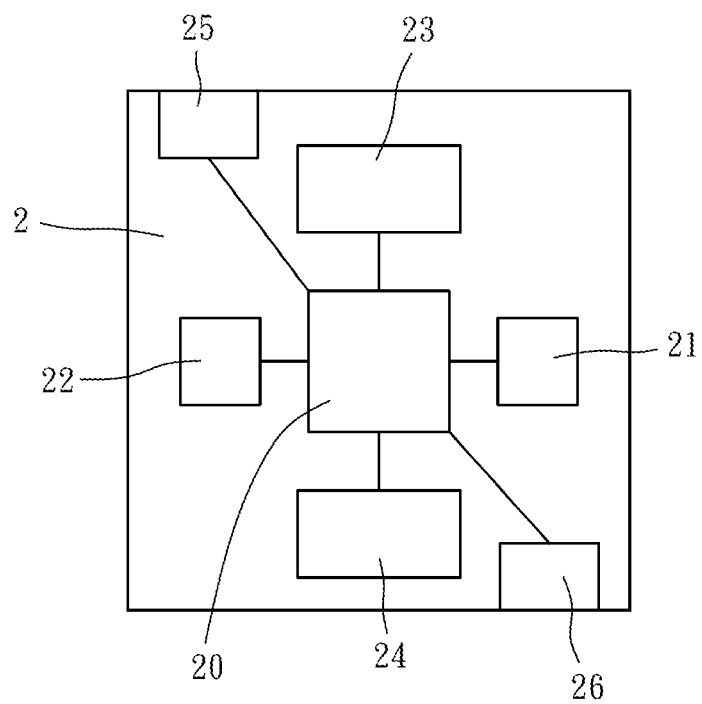
FIG. 6 is a functional block diagram of the vehicle radar in accordance with the second embodiment of the present invention.

As illustrated in FIG. 6, the vehicle radar 2 comprises a computing unit 20 having electrically connected thereto a memory unit 21, a communication interface 22, an output unit 23, a RF 24, a power source 25 and a data connection interface 26.

Step J: Take out the storage device 30, and then connect the storage device 30 to the vehicle radar 2. As a general practice, an SD card or a flash drive can be directly inserted into the data connection interface 26 of the vehicle radar 2.

Step K: Start up the vehicle radar.

Step L: The vehicle radar 2 checks whether there is a main program in the storage device. If yes, go to step G. If not, return to the original function and do not start up the setting action.

Step G: The vehicle radar 2 installs the main program.

Further, the aforesaid Step I can be carried out before Step C.

This second embodiment uses a storage device to transfer the main program so that the user can directly set the desired main program and setting parameters in the vehicle radar for application by means of plugging or replacing a card, achieving the purpose of simplifying installation and saving spare parts.

What is claimed is:

1. A vehicle radar setting method, comprising the step of:
    A) providing a setting tool comprising a processing unit having connected thereto a memory unit, a display, an input unit, and a power source;
    B) using said input unit of said setting tool to choose vehicle year, brand and model;
    C) fetching the corresponding vehicle radar main program according to the chosen vehicle year, brand and model;
    D) storing the fetched vehicle radar main program in a storage device;
    E) taking out said storage device and then connecting said storage device to said vehicle radar;
    F) starting up said vehicle radar;
    G) said vehicle radar checking whether said vehicle radar main program exists in storage device, and then proceeding to Step H) if yes, or stopping the installation if not; and
    H) said vehicle radar installing said vehicle radar main program.

2. The vehicle radar setting method as claimed in claim 1, wherein said vehicle radar main program contains a control program that controls the main function of said vehicle radar and predetermined setting parameters.

3. The vehicle radar setting method as claimed in claim 2, wherein said predetermined setting parameters include radar installation angle and/or height.

4. The vehicle radar setting method as claimed in claim 1, wherein said storage device is selectively a secure digital (SD) card or flash drive.

* * * * *

UNITED STATES PATENT AND TRADEMARK OFFICE
CERTIFICATE OF CORRECTION

| | | |
|---|---|---|
| PATENT NO. | : 10,977,019 B2 | Page 1 of 1 |
| APPLICATION NO. | : 15/813667 | |
| DATED | : April 13, 2021 | |
| INVENTOR(S) | : San-Chuan Yu et al. | |

It is certified that error appears in the above-identified patent and that said Letters Patent is hereby corrected as shown below:

On the Title Page

Please add (30) Foreign Application Priority Data:
106137454 TAIWAN 2017-10-30

Signed and Sealed this
Fourteenth Day of October, 2025

John A. Squires
*Director of the United States Patent and Trademark Office*